United States Patent Office 3,842,114
Patented Oct. 15, 1974

3,842,114
ISOMERIZATION CATALYST ACTIVATION
PROCESS
Swan T. Sie, Amsterdam, Netherlands, assignor to Shell
Oil Company, Houston, Tex.
No Drawing. Filed Mar. 5, 1973, Ser. No. 338,111
Claims priority, application Netherlands, Apr. 25, 1972,
7205564
Int. Cl. B01j 11/40
U.S. Cl. 252—455 Z 7 Claims

ABSTRACT OF THE DISCLOSURE

Catalysts comprising one or more platinum-group metals supported on H-mordenite and having a water content of up to 5% wt. are activated for isomerizing aliphatic saturated $C_4$–$C_6$ hydrocarbons by hydrating them at a temperature of not more than 150° C. to between 5 and about 21% wt. water and then dehydrating them at temperatures below 300° C. to 2–3% wt. water. Dehydration is accomplished by passing a gas stream over the catalyst and raising the temperature of the gas under conditions such that $$\frac{A \times B}{C} < 90,$$

where A represents the catalyst water content in percent wt. before the temperature is raised, B represents the heating-up rate in ° C./hour and C represents the space velocity of the gas in liters of gas/liter of catalyst/hour at the prevailing pressure, and where the space velocity of the gas at temperatures in excess of 150° C. is at least 5 liters of gas/liter of catalyst/hour at the prevailing pressure.

BACKGROUND OF THE INVENTION

The invention relates to a process for the activation of catalysts which are suitable for the isomerization of aliphatic saturated hydrocarbons at temperatures between 200° C. and 300° C. and which comprise one or more platinum-group metals supported on an H-mordenite.

Unbranched saturated aliphatic hydrocarbons are less suitable for use in gasolines because they have a lower octane number than branched aliphatic and aromatic hydrocarbons having the same number of carbon atoms. For this reason processes have been developed for the isomerization of unbranched aliphatic hydrocarbons having at least 4 and in particular 5 and 6 carbon atoms, to branched aliphatic hydrocarbons. It has been found that hydrogen-mordenites (H-mordenites) on which one or more platinum-group metals have been supported are very suitable as catalysts for processes of this type.

Mordenites are crystalline natural or synthetic zeolites of the alumino-silicate type; generally they have a composition, expressed in moles of oxide, of $$1.0 \pm 0.2\ Na_2O \cdot Al_2O_3 \cdot 10 \pm 0.5\ SiO_2;$$

the quantity of $SiO_2$ may also be larger. Instead of all or part of the sodium, other alkali metals and/or alkaline metal earth metals may be present.

In this application mordenites are also taken to include mixtures of crystalline mordenite and other materials, which latter may also be amorphous. In general, the mordenites which are suitable for use in the catalysts for the process according to the invention contain at least 50% and in general 80% of crystalline mordenite.

By H-mordenite is meant a mordenite in which the cations present have all or for the greater part been replaced by hydrogen ions.

The following method may suitably be used for the preparation of synthetic mordenite: an aqueous alkaline mixture having a composition, expressed in moles of the oxides, of $$1.2\text{–}2.8\ Na_2O \cdot Al_2O_3 \cdot 9.5\text{–}12.5\ SiO_2 \cdot 60\text{–}300\ H_2O,$$

which contains amorphous silica-alumina, sodium hydroxide and water is heated under pressure for 4–40 hours to a temperature between 180° C. and 260° C. and the resultant mordenite is subsequently separated from the mother liquor. Instead of using all or part of the sodium as hydroxide it is also possible to employ sodium salts of polybasic acids having for the highest dissociation step a pK-value measured at 18° C. which is higher than 10, such as sodium phosphate. The mordenite preparation may then be carried out at a slightly lower temperature, for example 140° C.–180° C.

The resultant mordenite usually has the form of a crystalline powder.

In order to prepare H-mordenite, the cations in natural or synthetic mordenite can be replaced by hydrogen ions by treating the mordenite, for example, with an aqueous solution of an acid (for example hydrochloric acid), as a result of which cations are exchanged for hydrogen ions, or by treatment, for example, with an aqueous solution of an ammonium salt (by which is meant a salt of ammonia, an amine, hydroxyl amine or hydrazine) as a result of which cations are exchanged for ammonium ions and a mordenite known as $NH_4$-mordenite is obtained, followed by calcining so that the nitrogen base present is decomposed.

If it is desired to use the mordenite in the form of larger particles, it may be mixed with an inert binder such as natural clays (for example kaolin or bentonite) and/or synthetic inorganic oxides such as alumina, silica, boria and zirconia or combinations thereof, such as silica-alumina and silica-zirconia. If a natural clay is used, any exchangeable metal ions present therein are advantageously replaced by ammonium ions (for example by treatment with an aqueous solution of an ammonium compound) before mixing the clay with H-mordenite or $NH_4$-mordenite. Particles having the desired size, such as pills, tablets, beads, spheres, briquettes, granules can be prepared from the mixture. Granules having a diameter of at least 0.5 mm. or cylinders of approx. 3 mm. are very suitable. The ammonium compounds present in the clay and in any $NH_4$-mordenite present are decomposed by calcining.

The metals of the platinum group are ruthenium, rhodium, palladium, osmium, iridium and platinum. The metal or metals of this group can be supported on the H-mordenite by known techniques, such as impregnation, percolation, on exchange, for example competitive ion exchange, with generally aqueous solutions of compounds of one or more of the said metals. Ion exchange is particularly suitable for loading the H-mordenite, in particular exchange with the aid of compounds in which the metal in question is present as cation, such as platinum or palladium complexes obtained with the aid of ammonia, hydrazine, hydroxyl amine or alkyl amines. The loading with platinum-group metals can be carried out with H-mordenite or with an $NH_4$-mordenite. In the latter case H-mordenite on which one or more metals of the platinum group have been supported is only formed after calcination.

In preparing an H-mordenite loaded with a platinum-group metal, an $NH_4$-mordenite may also very suitably be impregnated with a salt of one or more of these metals dissolved in an aqueous solution of an ammonium salt, for example ammonium formate. After activation by calcining, a metal-loaded H-mordenite is obtained.

Catalysts containing 0.1–1% by weight of one or more platinum-group metals, preferably platinum, based on the total catalyst, are very suitable for the isomerization of hydrocarbons.

To activate the catalysts, the H-mordenites or NH$_4$-mordenites (if desired mixed with natural clays in for example the ammonium form), which have been treated with a solution or a compound of one or more platinum-group metals, are generally calcined, i.e., treated with an oxygen-containing gas (preferably air), at maximum temperatures of 350° C. to 530° C. It is advantageous to have the calcination at a temperature of 350° C.–530° C. preceded by calcination at a lower temperature (for example 300° C.–350° C.) in order to prevent sintering of the platinum-group metal and destruction of active sites in the H-mordenite.

In addition, the catalyst is sometimes treated with hydrogen at a temperature between 350° C. and 530° C. before the catalyst is contacted with the hydrocarbon or mixture of hydrocarbons to be isomerized in order to reduce the platinum-group metal to the metallic form.

Applicant's co-pending patent application of even date discloses that at temperatures of 350° C. to 530° C. the catalyst must be surrounded during periods prior to isomerization by a gas in which the partial water vapor pressure ($P_{H_2O}$), expressed in mm. Hg, satisfies the relationship $$\frac{T-450}{50} < P_{H_2O} < 2.8$$

(where T represents the temperature in ° C.) in order to obtain a catalyst with optimum activity for the isomerization of aliphatic hydrocarbons. Sometimes, however, this requirement is not met during the calcination in an oxygen-containing gas, during the hydrogen treatment described above or during regeneration of a catalyst which has lost all or part of its activity during use. In such a case a catalyst is obtained which contains very little water and displays less attractive properties for the isomerization of hydrocarbons at temperatures between 200° C. and 300° C.

The attractiveness of an isomerization catalyst is judged on the basis of quality and yield of the hydrocarbon mixture which can be obtained with the aid of the catalyst. This quality can be determined from the octane number of the product obtained after isomerization, starting from a given hydrocarbon feed mixture.

It has been found that a catalyst which contains a maximum of 5% by weight of water is less attractive for isomerization, cannot be improved in a simple manner by treating it with a water-containing gas (if the water content is lower than desired) until the desired water content of the catalyst, which is in general 2 to 3% by weight, has been reached nor, if the water content is more than that desired, by simple dehydration to the desired water content. Water content as used in this application means the loss of weight (in percent) which occurs when calcining at a temperature between 900° C. and 1,000° C.

THE INVENTION

It has been found that a treatment with water must be carried out until a considerably larger quantity of water has been incorporated in the catalyst than is eventually required for obtaining an active catalyst and that the excess amount of water must be removed under accurately defined conditions.

According to the invention, a catalyst with a maximum water content of 5% by weight is hydrated at a temperature of not more than 150° C. to a water content of between 5% and about 21% wt. and subsequently dehydrated at temperatures below 300° C. to a water content of 2–3% by weight, while passing through a gas and raising the temperature under such conditions that $$\frac{A \times B}{C} < 90$$

where A represents the percentage by weight of water before the temperature is raised, B represents the heating-up rate in ° C. per hour and C represents the space velocity of the gas in liters of gas per liter of catalyst per hour at the prevailing pressure, and that the space velocity of the gas at temperatures in excess of 150° C. is at least 5 liters of gas per liter of catalyst per hour at the prevailing pressure.

The heating-up rate B in ° C. per hour is determined by dividing the difference between final and initial temperature by the time that has elapsed between the beginning of the heating-up and attainment of the final temperature and by covering the value found to ° C. per hour. In general, the temperature will be allowed to increase gradually with time.

During heating-up the space velocity, C, of the gas may be subject to change and increase; for example from 20 to 40 liters per liter of catalyst per hour at the prevailing pressure. In the said formula the average space velocity must then be filled in for C: this is determined by dividing the total gas volume (in liters per liter of catalyst under the prevailing conditions) that has passed through the catalyst during the period between beginning of the temperature increase and attainment of the final temperature by this period of time expressed in hours. The space velocity of the gas at temperatures in excess of 150° C. is not an average velocity but a velocity measured at any given moment. Naturally this velocity may be lower for very short periods (for example as a result of interruptions or the like) without this being considered a departure from the process according to the invention.

Generally the catalyst to be activated will contain considerably less than 5% by weight of water, for example less than 2% by weight.

The hydration to a catalyst water content of more than 5% by weight may be carried out in any desired manner, for example by contacting the catalyst having a water content of less than 5% by weight with a water-containing gas such as moist air. The moist gas is very suitably passed through the catalyst which is present in a reactor in the form of shaped particles. The hydration is generally carried out between ambient temperature and 150° C. The catalyst absorbs water from the moist gas and the contact with the moist gas is discontinued when sufficient water has been absorbed.

Some of the water present in the hydrated catalyst is subsequently removed therefrom. This is very conveniently effected with a dry (i.e., a completely or substantially completely anhydrous) gas.

Hydrogen or hydrogen-containing gases are very suitable, for example mixtures of hydrogen and hydrocarbons which become available in the catalytic reforming of petroleum fractions. For the removal of water from the hydrated catalyst use can of course also be made of the gases which are to be isomerized with the aid of the catalyst.

The gas used for removing the water is very suitably passed over the hydrated catalyst, the temperature being slowly (for example over at least one hour) raised from room temperature to the desired temperature (for example between 250° and 270° C.), and the catalyst is preferably kept at this temperature for some time, for example for 1 to 3 hours, while the said gas continues to be passed over it.

The isomerization of aliphatic hydrocarbons which must of course contain at least 4 carbon atoms is generally carried out in the presence of hydrogen at temperatures between 200° C. and 300° C. The hydrogen partial pressure may vary between 3 and 70 kg./cm.$^2$, and more preferably between 5 and 50 kg./cm.$^2$. The space velocity may be between 0.5 and 10 liters of liquid hydrocarbon feed per liter of catalyst per hour and the gas supply between 50 and 2,500 liters of hydrogen per kg. of feed. The hydrogen/feed molar ratio may vary between wide limits and is normally between 0.5:1 and 10:1. Preferably space velocities of 1 to 3 liters of hydrocarbon feed/liter of catalyst/hour and a hydrogen/feed molar ratio of 1:1 to 3:1 are used.

The feed used may be pure hydrocarbons such as pentane or technical mixtures which contain hydrocarbons having for example 4–6 carbon atoms, such as tops which become available in the distillation of petroleum. The feed may also contain olefinically unsaturated hydrocarbons which may participate in the isomerization process. The presence of small amounts of aromatic compounds (for example benzene) and sulfur compounds has no adverse effect on the isomerization reaction or on the life of the catalyst.

In the case of a mixture of straight and branched paraffins, for example tops, of which the straight paraffins are to be converted into branched paraffins by isomerization, the branched paraffins may if desired be completely or partly removed from the mixture before it is subjected to the isomerization process. This may very suitably be effected with the aid of molecular sieves or distillation.

Naturally, paraffins having straight chains (for example n-pentane) will still occur in the product obtained after the isomerization. These are advantageously separated from the branched paraffins, for example by distillation or with the aid of molecular sieves, and are subsequently subjected to the isomerization process, preferably by adding these unbranched paraffins to fresh feed.

It is also possible to add the product obtained after the isomerization to the original mixture of straight and branched paraffins, to remove from the resultant mixture all or a portion of the branched paraffins (for example by distillation or with the aid of molecular sieves) and to subject the remaining portion of the latter mixture to the isomerization process with the aid of the catalyst activated in accordance with the invention.

EXAMPLE I

Preparation of Pt/H-mordenite catalyst in the form of extrudates

Step A: Sodium mordenite powder (sodium Zeolon powder of the Norton Company) was suspended in a 2-molar hydrochloric acid solution (10 l./kg. Na mordenite) and the suspension was heated at 100° C. for one hour. The solid material was filtered off and washed with deionized water (5 l./kg. of Na mordenite). A 2-molar solution of $NH_4NO_3$ in water was subsequently percolated through a bed of the solid material until hardly any sodium could be traced in the effluent.

Step B: The solid material obtained after Step A was washed with deionized water and dried in air at 100° C. The dried material was added with stirring to deionized water (5 liters of water/kg. of original Na mordenite). A solution of $Pt(NH_3)Cl_2$ in water was added to the slurry (3.5 g. of Pt/kg. of H-mordenite) after which the slurry was stirred for another hour. After filtration the solid material was washed with deionized water, dried in air at 120° C. and, after mixing with 20% by weight of an alumina binder and addition of water, worked up by kneading into a doughy substance which was extruded to extrudates having a diameter of approximately 1.5 mm.

Step C: The material obtained after Step B was dried in air at 120° C. The dried material was subsequently heated in a stream of dry air to 350° C. and maintained at this temperature for one hour. The temperature was then gradually raised to 500° C. and maintained at this value for several hours while a stream of dry air was passed through the mass of extrudates. The material was subsequently cooled to room temperature in the stream of dry air.

EXAMPLE II

A catalyst prepared as described in Example I was divided into two portions. One of the portions was allowed to adsorb water by being contacted with moist ambient air. The water content (a) of the wetted catalyst was 14.4% by weight (=loss of weight when calcining at 900° C.).

This wetted catalyst was subsequently tested for the isomerization of a desulfurized $C_5/C_6$ fraction ("tops") obtained by distillation of a Middle East crude oil. The "tops" feed contained 37.7% by weight of iso+normal pentane and less than 1 p.p.m. w./w. of sulfur. The $C_5/C_6$ weight ratio was 0.60. The isopentane/$C_5$ paraffins ratio was 36.1% and the 2.2-dimethyl butane/$C_6$ paraffins ratio 0.7%. The research octane number of the unleaded "tops" (RON-O) was 64.3.

After the reactor had been filled with the catalyst the latter was gradually heated over a period of 1½ hours from ambient temperature to 260° C. (equalling a heating-up rate (B) of 160° C./hour) while 560 $Nl.^{-1} \cdot h^{-1}$ of hydrogen were passed through at a pressure of 30 kg./cm.$^2$ (an average of 28 liters of gas/liter of catalyst at the relevant pressure and temperatures (C). While maintaining the said hydrogen stream, the temperature was kept at 260° C. for 2½ hours. Water content measurements made during the test showed that the previous steps had reduced the water content of the catalyst to 3% by weight. The feed was subsequently pumped in and the isomerization carried out under the following conditions:

Temperature _____ 260° C.
Pressure _____ 30 kg./cm.$^2$.
Space velocity _____ 1 kg. of tops/kg. of cat./h.
$H_2$/tops molar ratio _____ 2.5.
$H_2O$ in gas _____ 200 p.p.m. v./v.

The other portion of catalyst as such, i.e., with a water content of 3% by weight (=loss of weight after calcining at 900° C., indicated as LOI 900° C.), was also tested for the isomerization of the above $C_5/C_6$ tops under identical conditions as the wetted catalyst. The results of the two experiments are given in the table below.

| Experiment | 2A | 2B |
|---|---|---|
| Wetting | Nonwetted | Wetted |
| LOI 900° C., percent by weight | 3 | 14.4 |
| Yields of $C_5$ and up, percent by weight | 98.5 | 98.5 |
| Iso-$C_5/C_5$ paraffins, percent by weight | 59.6 | 65.5 |
| 2.2-DMB/$C_6$ paraffins, percent by weight | 16.1 | 17.8 |
| Octane number $C_5$ and up, RON-O | 76.7 | 78.7 |
| $A \times B$ | | 82 |
| $C$ | | |

It can be seen from the above table that by rewetting in air to a water content of 14.4% by weight and dehydration to 3% by weight under the conditions according to the invention considerably better results are obtained than with the non-wetted catalyst.

EXAMPLE III

A similar catalyst as used in Example II was divided into several portions. Two portions were treated as follows:

Portion A, a blank, was tested as such for isomerization activity. This sample contained 1.8% by weight of water (=loss of weight after calcining at 900° C.).

While moist nitrogen (75% relative humidity at 70° C.) was being passed through, portion B was allowed to adsorb water at 70° C. for 5 hours. The water take-up was 11.7% by weight so that the water content of the wetted catalyst was 13.5% by weight.

Portion C was wetted to a water content of 14.3% by weight by passing through moist hydrogen (75% relative humidity at 70° C.) at 70° C.

By passing through moist air (75% relative humidity at 70° C.) portion D was wetted to a water content of 12.0% by weight at 70° C.

The above portions of catalyst were introduced separately into a reactor and gradually heated over a period of 1.5 hours from room temperature to 260° C. (heating-up rate 160° C./h. (B)) while passing through 500 $Nl \cdot l^{-1} \cdot h.^{-1}$ (an average of 32 liters of gas/liter of catalyst/h. at the relevant pressure and temperature (C)). While maintaining said hydrogen stream, the temperature was kept at 260° C. for 2.5 hours, whereupon the water content of the catalyst was reduced to 2–3% by weight.

A feed was then pumped in consisting of a desulfurized $C_5/C_6$ fraction ("tops") obtained by distillation of a Middle East crude oil. This feed contained 45.6% by weight of iso+normal $C_5$ and 0.7 p.p.m. w./w. of sulfur. The $C_5/C_6$ weight ratio was 0.85.

The iso-$C_5/C_6$ paraffins ratio was 37.7%, the 2.2-dimethyl butane/$C_6$ paraffins ratio 0.8%. The research octane number of the unleaded tops (RON-O) was 67.9.

The isomerization was carried out under the following conditions:

Temperature _____ 260° C.
Pressure _____ 24 kg./cm.²
Space velocity _____ 1 kg. of tops/kg. catalyst/h.
$H_2$/tops molar ratio _____ 2.5.
$H_2O$ in gas _____ 200 p.p.m. v./v.

The results are summarized in the following table.

| Experiment | 3A | 3B | 3C | 3D |
|---|---|---|---|---|
| Wetting | (¹) | (²) | (²) | (³) |
| LOI 900° C., percent by weight (A) | 1.8 | 13.5 | 14.3 | 12.0 |
| Yield of $C_5$ and higher, percent by weight | 97.2 | 97.7 | 97.1 | 97.4 |
| Iso-$C_5/C_6$ paraffins, percent | 60.4 | 64.6 | 66.5 | 66.0 |
| 2.2-DMB/$C_6$ paraffins, percent | 15.2 | 19.0 | 19.9 | 19.7 |
| Octane number $C_5$ and up, RON-O | 78.0 | 79.7 | 79.9 | 79.8 |
| $\frac{A \times B}{C}$ | | 68 | 72 | 60 |

¹ Non-wetted.
² Wetted in $N_2$.
³ Wetted in air.

It can be seen from the above table that by wetting to a water content of 12–14.3% by weight, followed by dehydration to 2–3% by weight, under the specified conditions, considerably better results are obtained than with a non-wetted catalyst. It makes little difference whether wetting is carried out in nitrogen, hydrogen or air.

EXAMPLE IV

Portions of the same catalyst as used in Example III were wetted at 70° C. to various water contents by passing through moist nitrogen (75% relative humidity at 70° C.). The wetted samples were subsequently dehydrated to a residual water content of 2–3% by weight in the manner described in Example III and then tested for isomerization of $C_5/C_6$ tops. The feed used and the isomerization conditions were equal to those applied in Example III.

The results are given in the following table. By way of comparison the results obtained with a non-wetted catalyst are also included in the table.

| Test | 3A | 4A | 4B | 4C | 4D | 4E |
|---|---|---|---|---|---|---|
| LOI 900° C., percent by weight (A) | ¹1.8 | 5.6 | 13.5 | 15.8 | 19.1 | 22.3 |
| Yield of $C_5$ paraffins and higher, percent by weight | 97.2 | 97.5 | 97.7 | 97.3 | 98.3 | 98.7 |
| Iso-$C_5/C_6$ paraffins, percent | 60.4 | 68.0 | 65.6 | 64.2 | 60.8 | 53.6 |
| 2.2-DMB/$C_6$ paraffins, percent | 15.2 | 19.0 | 19.0 | 19.1 | 17.2 | 12.3 |
| Octane number $C_5$ and up, RON-O | 78.0 | 80.4 | 79.7 | 79.7 | 78.5 | 76.7 |
| $\frac{A \times B}{C}$ | | 28 | 68 | 79 | 96 | 112 |

¹ Non-wetted.

It can be seen from the results that by wetting the catalyst to a water content between 5 and about 16% wt., followed by dehydration through heating up to 260° C. at a rate of 160° C./h. while passing through an average of 32 liters of $H_2$/liter of catalyst/h. considerably improved isomerization properties are obtained. When wetting in excess of approx. 16% by weight, this improvement declines as the water content is increased and wetting to 22.3% by weight followed by dehydration under the specified conditions does not even yield any advantage over the non-wetted catalyst. In the present circumstances, viz. space velocity (C) of the gas (32 liters/liter of catalyst/h.) and temperature increase per hour (B) (160° C.), the product $$\frac{A \times B}{C} = 90$$

at a wetting percentage (A) of 18%, in other words, at a wetting percentage above 18% the process in question is not in accordance with the invention.

The poor results obtained in the dehydration of the catalyst wetted to 22.3% by weight cannot be attributed to insufficient dehydration of the highly wetted catalyst. Water content measurements showed that after the dehydration step the residual water content was 2.5% by weight. Even when the isomerization test, in which a catalyst having too high a residual water content might be further dehydrated, was continued at 260° C. for a long time, no improvement of the isomerization properties was observed.

EXAMPLE V

Portions of the same catalyst as used in Examples III and IV were wetted at 70° C. in moist nitrogen (75% relative humidity at 70° C.) to a water content of 13.4 and 16.2% by weight. The samples were heated up in stagnant $H_2$ to 260° C. (heating-up rate 160° C./h.) at 24 atm., maintained in stagnant $H_2$ and at 260° C. for 1.5 hours, hydrogen (500 Nl./liter of catalyst/h.=41 l·l.⁻¹·h.⁻¹ of 260° C. and 24 atm.) being subsequently passed through at 260° C. until the residual water content was 2–3% by weight. The catalysts were subsequently tested for isomerization of $C_5/C_6$ tops. The feed and the isomerization conditions used were the same as in Example III.

The results are summarized in the following table. For comparison, the results obtained with non-wetted catalyst in experiments 4B of Example IV have also been included in the table.

| Experiment | 3A | 4B | 5A | 5B |
|---|---|---|---|---|
| LOI 900° C., percent by weight | ¹1.8 | 13.5 | 13.4 | 16.2 |
| Gas rate during heating-up, l·l.⁻¹·h.⁻¹ | 22–41 | 22–41 | 0 | 0 |
| Yield of $C_5$ and higher, percent by weight | 97.2 | 97.7 | 99.2 | 99.4 |
| Iso-$C_5/C_6$ paraffins, percent by weight | 60.4 | 64.6 | 48.1 | 46.2 |
| 2.2-DMB/$C_6$ paraffins, percent by weight | 15.2 | 19.0 | 10.0 | 9.6 |
| Octane number $C_5$ and up, RON-O | 78.0 | 79.7 | 74.3 | 74.1 |
| $\frac{A \times B}{C}$ | | 68 | | |

¹ Non-wetted.

The examples show that wetting followed by dehydration is only advantageous if the dehydration is carried out under appropriate circumstances. If the rate of flow during heating-up between 20° C. and 260° C. is insufficient, quite the opposite result is obtained.

EXAMPLE VI

A portion of the same catalyst as used in Examples III–V was wetted at 70°C. in a stream of moist hydrogen (75% relative humidity at 70° C.) until the water content was 21.1% wt. The wetted catalyst was subsequently partly dehydrated by passing through dry nitrogen (250 Nl.·l.⁻¹·h.⁻¹) at 70° C. and 1 atm. until the water content had dropped to 13.1% wt. The water content was then further reduced to 2.5% wt. in the manner described in Example III. The catalyst was subsequently tested for isomerization of $C_5/C_6$ tops under the conditions specified in Example III. In this experiment A=13.1; B=160; C=32.

The results of this experiment, designated as experiment 6A, are given in the following table. By way of comparison this table also includes the results which were obtained with the non-wetted catalyst (Example III, test 3A) and with a catalyst wetted to an approximately equal water content but dehydrated in the manner of Examples III and IV, i.e., without the partial dehydration step at 70° C. (Example IV, experiment 4E).

| Experiment | 3A | 6A | 4E |
|---|---|---|---|
| LOI 900° C., percent by weight | [1]1.8 | 21.2 | 22.3 |
| Yield of $C_5$ and higher, percent by weight | 97.2 | 97.5 | 98.7 |
| Iso-$C_5$/$C_5$ paraffins, percent | 60.4 | 65.6 | 53.6 |
| 2.2-DMB/$C_6$ paraffins, percent | 15.2 | 19.6 | 12.3 |
| Octane number $C_5$ and up, RON-0 | 78.0 | 79.8 | 76.7 |
| $\dfrac{A \times B}{C}$ | | 66 | 112 |

[1] Non-wetted.

It can be seen from the table that wetting to a high water content as such is not harmful, provided the dehydration is carried out under suitable conditions.

EXAMPLE VII

In this example the effect of the dehydration conditions on catalysts which had been wetted to a high water content was further examined.

Portions of the same catalyst as used in Examples III–VI were wetted at 70° C. in a stream of moist nitrogen (relative humidity 75% at 70° C.) until approximately 20% by weight of water had been taken up. The wetted catalyst samples were dehydrated under varying conditions to a water content of 2–3% by weight and tested for the isomerization of $C_5$/$C_6$ tops. The feed used and the isomerization conditions were the same as in Example III.

The dehydration conditions and the isomerization test results are given in the following table. Also included in this table, by way of comparison, are the results obtained with the non-wetted catalyst (Example III, experiment 3A).

| Experiment | 3A | 7B | 7C | 7D |
|---|---|---|---|---|
| LOI 900° C., percent by weight (A) | [1]1.8 | 22.3 | 21.3 | 21.3 |
| Hydration/starting-up conditions: | | | | |
| Pressure, atm | 24 | 24 | 24 | 1 |
| Hydrogen flow rate, Nl.·l.$^{-1}$·h.$^{-1}$ | 500 | 100 | 500 | 500 |
| Hydrogen flow rate, l.l.$^{-1}$·h (average, C.) (of the relative pressure and temperature) | 32 | 32 | 32 | 760 |
| Heating-up rate in the range 20–260° C., ° C./h. (B) | 160 | 160 | 15 | 160 |
| Time required at 260° C., before isomerization start-up, h | 2.5 | 2.5 | 2.5 | 2.5 |
| Yield of $C_5$ and higher, percent by weight | 97.2 | 98.7 | 97.3 | 97.3 |
| Iso-$C_5$/$C_5$ paraffins, percent by weight | 60.4 | 53.6 | 64.6 | 62.5 |
| 2.2-DMB/$C_6$ paraffins, percent by weight | 15.2 | 12.3 | 18.1 | 16.8 |
| Octane number of $C_5$ and up, RON-0 | 78.0 | 76.7 | 79.5 | 78.7 |
| $\dfrac{A \times B}{C}$ | | 112 | 10 | 4.5 |

[1] Non-wetted.

The above results show that hydration to a water content of approx. 21% by weight, followed by dehydration is only advantageous if the rate of heating-up is sufficiently low and/or sufficient gas is passed through the sample during the dehydration (experiments 7C and 7D).

What is claimed is:

1. A process for activating a catalyst comprising one or more platinum-group metals supported on H-mordenite for isomerizing aliphatic saturated $C_4$–$C_6$ hydrocarbons at temperatures between 200° C. and 300° C. which comprises:

hydrating a catalyst containing up to 5% wt. water at a temperature of not more than 150° C. to a water content between 5 and about 21% wt.;

and subsequently dehydrating said catalyst at temperatures below 300° C. to a water content of 2–3% wt. by contacting said catalyst with a flowing gas stream while raising the temperature under such conditions that $$\frac{A \times B}{C} < 90,$$

where A represents the catalyst water content in percent wt. before the temperature is raised, B represents the heating-up rate in ° C./hour and C represents the space velocity of the gas in liters of gas/liter of catalyst/hour, and at temperatures above 150° C. said space velocity is at least 5.

2. The process of claim 1 wherein the catalyst contains less than 2% wt. water before activation.

3. The process of claim 1 wherein the catalyst is hydrated with a water-containing gas.

4. The process of claim 3 wherein the catalyst is hydrated between ambient temperature and 100° C.

5. The process of claim 1 wherein the dehydrating gas is hydrogen or a hydrogen-containing gas.

6. The process of claim 1 wherein the temperature of the dehydrating gas is raised in at least 1 hour from room temperature to a temperature between 250° C. and 270° C. and said temperature is maintained with flowing gas until the desired catalyst water content is reached.

7. The process of claim 1 wherein the catalyst contains from 0.1–1% wt. platinum and less than 2% wt. water before activation, and wherein said catalyst is hydrated to a water content between 5 and about 16% wt. with a water-containing gas between ambient temperature and 100° C.

References Cited

UNITED STATES PATENTS

| | | | |
|---|---|---|---|
| 3,420,772 | 1/1969 | Eck et al. | 252—420 X |
| 3,622,506 | 11/1971 | De Rosset | 252—420 X |

CARL F. DEES, Primary Examiner